United States Patent
Agrawal et al.

(10) Patent No.: US 12,309,489 B2
(45) Date of Patent: May 20, 2025

(54) CAMERA SELECTION BASED ON LIGHT BLOCKAGE

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 257 days.

(21) Appl. No.: 18/320,796

(22) Filed: May 19, 2023

(65) Prior Publication Data

US 2024/0388794 A1  Nov. 21, 2024

(51) Int. Cl.
*H04N 23/667* (2023.01)
*G06F 1/16* (2006.01)
*H04N 23/90* (2023.01)

(52) U.S. Cl.
CPC ......... *H04N 23/667* (2023.01); *G06F 1/1641* (2013.01); *G06F 1/1686* (2013.01); *H04N 23/90* (2023.01)

(58) Field of Classification Search
CPC ...... H04N 23/667; H04N 23/90; H04N 23/45; H04N 23/698; G06F 1/1641; G06F 1/1686
See application file for complete search history.

(56) References Cited

U.S. PATENT DOCUMENTS

| | | | | |
|---|---|---|---|---|
| 2014/0152858 | A1* | 6/2014 | Yagi | G06F 3/041 348/208.2 |
| 2014/0375835 | A1* | 12/2014 | Bos | H04N 23/667 348/222.1 |
| 2018/0338085 | A1* | 11/2018 | Kashiyama | H04N 23/71 |

* cited by examiner

*Primary Examiner* — Gevell V Selby
(74) *Attorney, Agent, or Firm* — Isidore PLLC

(57) ABSTRACT

A method provides techniques for selecting a camera based on light blockage of the camera lens. The method includes monitoring, by at least one processor of an electronic device an amount of light impinging on each of a first lens of a first image capturing device and a second lens of a second image capturing device. The method includes, in response to detecting the blockage of light entering a lens of one of the at least two image capturing devices, and the blockage occurring for a duration exceeding a preset time, setting, as an active image capturing device among the at least two image capturing devices, a selected one of the at least two image capturing devices having a corresponding lens at which the blockage is detected.

20 Claims, 8 Drawing Sheets

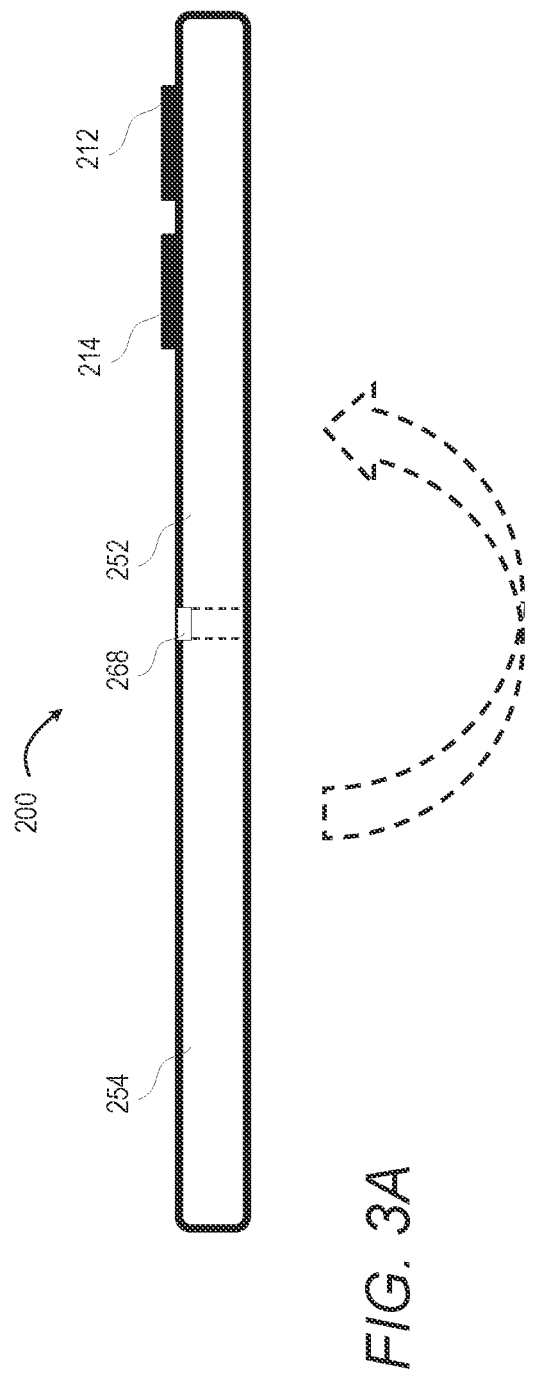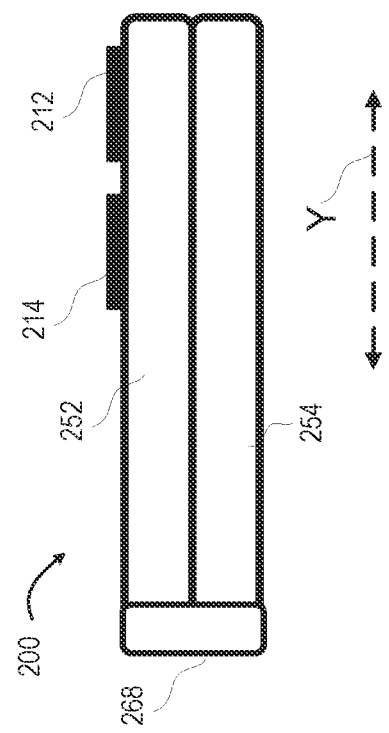
FIG. 3A
FIG. 3B

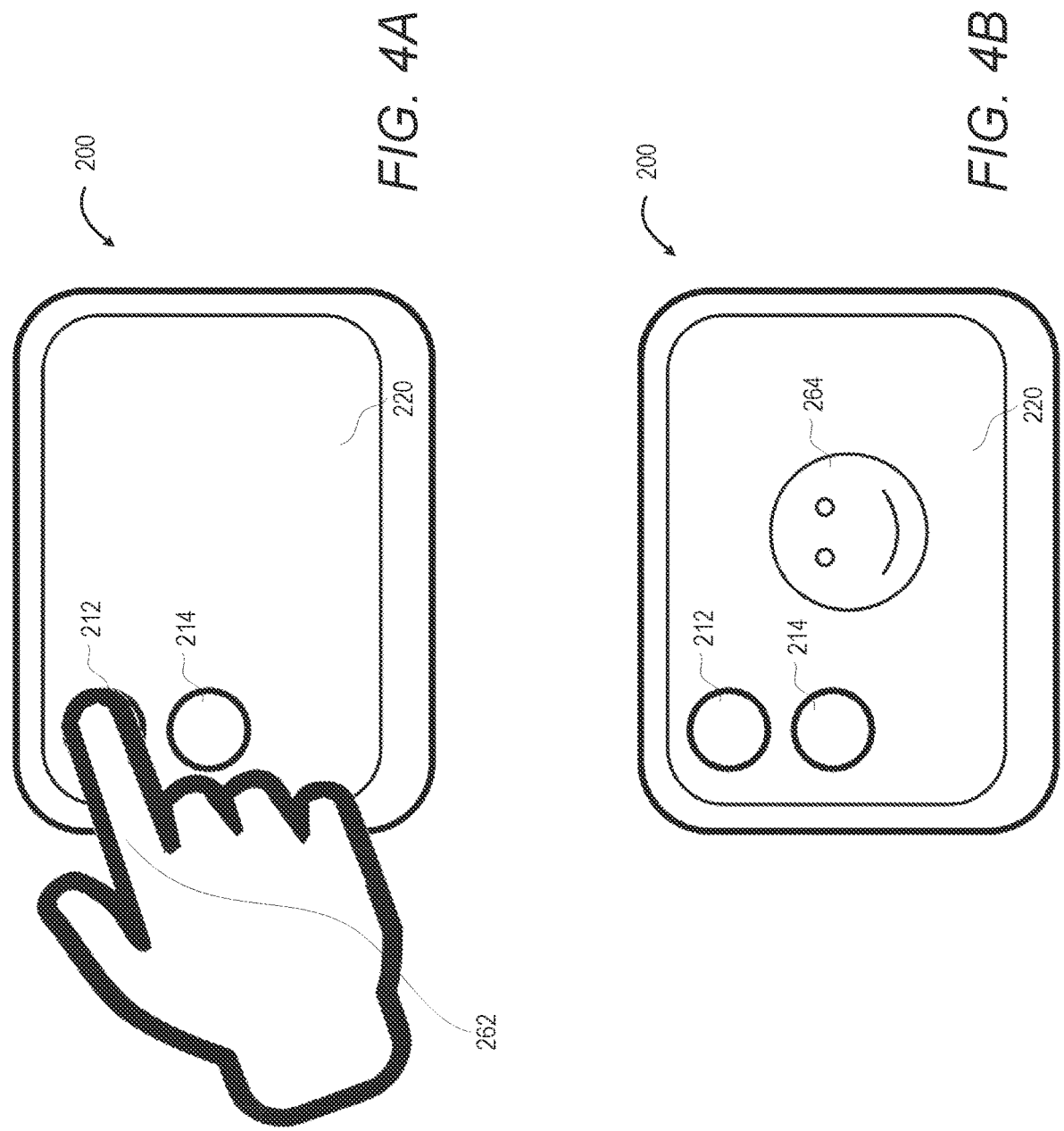

CAMERA SELECTION BASED ON LIGHT BLOCKAGE

BACKGROUND

1. Technical Field

The present disclosure generally relates to portable communication devices, and more specifically to communication devices that include multiple image capture devices.

2. Description of the Related Art

Modern smartphones and tablet computers are equipped with high-resolution displays, as well as integrated digital cameras that capture high quality still pictures and videos. Most modern smartphones have at least two image capturing devices (cameras), with some models having three or more cameras. The cameras found in smartphones are typically small and compact, designed to fit within the slim profile of the device.

The cameras found on a smartphone or tablet computer can include a wide-angle camera. This type of camera has a wide field of view and is used for capturing landscapes, group photos, and architecture. Additionally, smartphones and tablets may include a telephoto camera. The telephoto camera has a narrower field of view than a standard camera and is used for zooming in on distant objects. Smartphones and tablets can further include an ultra-wide camera. The ultra-wide camera has an even wider field of view than a standard wide-angle camera, allowing for even more of the scene to be captured in a single photo. Some devices may include a macro camera, which can be used for capturing extreme close-up shots of small objects such as flowers, insects, or jewelry. Most smartphones include at least one camera mounted on, at, or below a user facing side at which a display is presented, to enable self-photos (selfies) and support for video calls and video conferencing. Thus, a modern smartphone can provide a user with multiple cameras to choose from for taking a photograph.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A is a diagram illustrating a side view of the example communication device of FIG. 2A, in an extended/open configuration, according to one or more embodiments;

FIG. 3B is a diagram illustrating a side view of the example communication device of FIG. 2A, in a folded configuration, according to one or more embodiments;

FIG. 4A is a diagram illustrating an example of selecting a first image capturing device using light blockage of the camera lens, according to one or more embodiments;

FIG. 4B is a diagram illustrating rendering of image content from the first image capturing device that was selected using light blockage of the camera lens, according to one or more embodiments;

DETAILED DESCRIPTION

Figure 1:
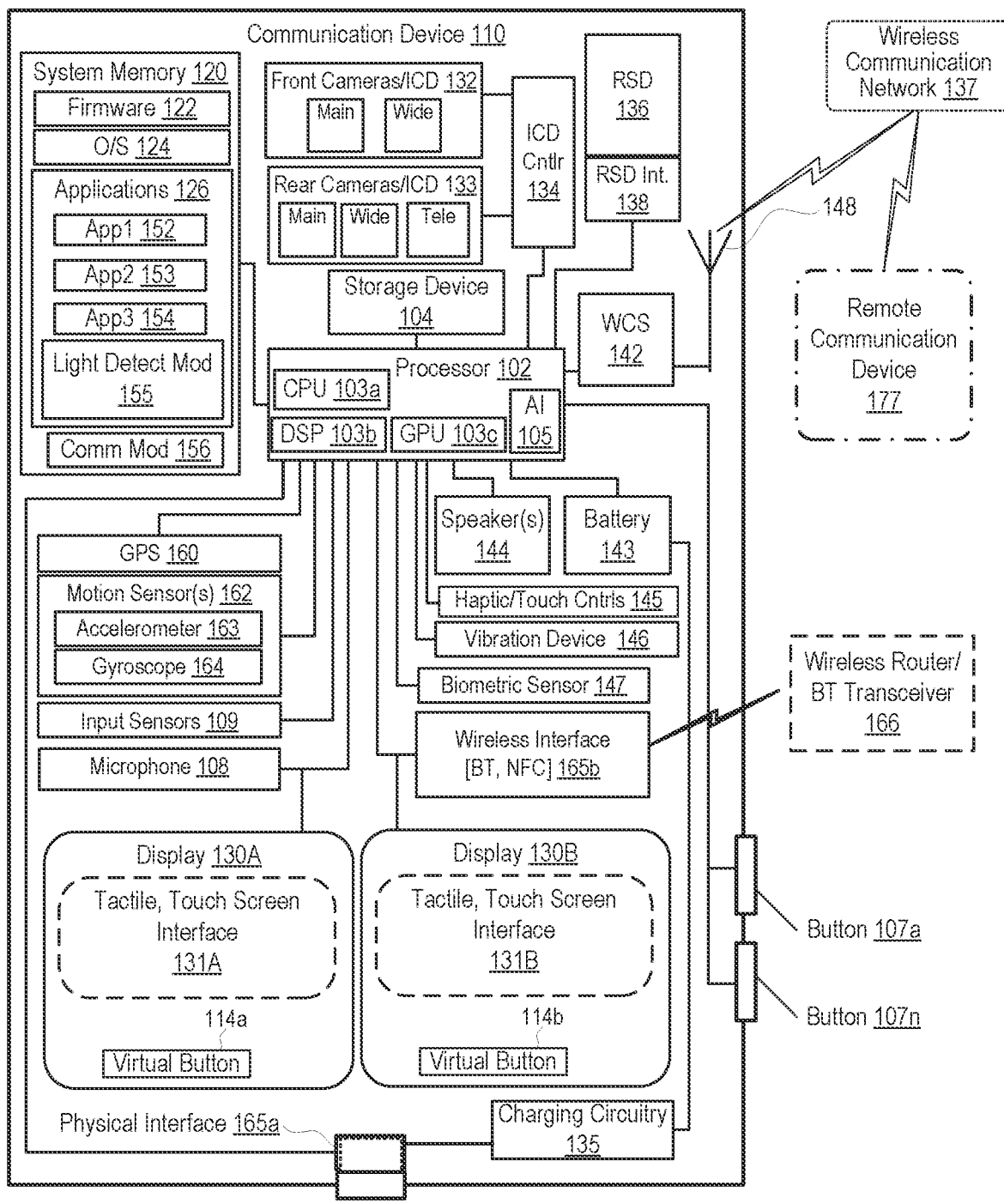
FIG. 1 depicts an example component makeup of a communication device that can be configured to select a camera based on light blockage at the camera lens, according to one or more embodiments.

According to different aspects of the disclosure, an electronic device, one or more methods, and a computer program product enable selection of an image capturing device based on light blockage of a lens of the image capturing device. The light blockage can be accomplished by a user by placing his/her finger over a lens corresponding to the image capturing device for a duration exceeding a predetermined time interval, thereby providing a convenient technique for a user to quickly select an image capturing device for use.

Traditionally, a handheld communication device (or electronic device) such as a smartphone includes at least one front-facing camera, typically used to take self-photos (or a 'selfie'), and may include one or more rear-facing cameras, which are typically used by the user to take photographs of other objects. However, advancements such as flexible displays have enabled configurations that allow a user to take a self-photo using the rear-facing cameras. The rear-facing cameras are typically more numerous and of higher quality than the front-facing (user-facing) camera typically found on a smartphone. Therefore, use of the rear-facing cameras for self-photos provide improved photographic quality, as well as a wider range of creative choices for composing and taking a photograph. However, in the configurations that enable the use of rear-facing cameras for self-photos, there can be a limited display area for user interface controls, making it cumbersome to select a camera to use from amongst multiple rear-facing cameras.

Disclosed embodiments address the aforementioned problems by enabling selection of an image capturing device (camera) based on light blockage of the camera lens. By blocking (or limiting) light received by the lens, for a duration exceeding a predetermined time interval (e.g., two seconds), from one camera selected from the multiple cameras, the camera that was blocked is selected as the active image capturing device. Thus, disclosed embodiments provide a fast and convenient way for a user to select a camera to use from amongst multiple cameras, without requiring the use of any display area or user interface of an electronic display. Since display area can be limited in these configurations, disclosed embodiments enable the display to be used for other options or features, and/or present additional area for rendering image content from a camera, thereby providing an improved user experience.

According to a first described aspect of the disclosure, there is provided an electronic device that includes: an enclosure having a first surface and a second surface, opposed to the first surface. The electronic device includes at least two image capturing devices including: (i) a first image capturing device having a first lens and that produces first image content; and (ii) a second image capturing device having a second lens that differs from the first lens and that produces second image content. The first image capturing device and the second image capturing device are disposed on a same surface of the electronic device. The electronic device includes a controller communicatively coupled to the first image capturing device and the second image capturing device, and which: monitors an amount of light impinging on each of the first lens and the second lens; and in response to detecting a blockage of light entering a lens of one of the at least two image capturing devices, setting, as an active image capturing device among the at least two image capturing devices, a selected one of the at least two image capturing devices having a corresponding lens at which the blockage is detected.

According to a second described aspect of the disclosure, there is provided a method that includes monitoring, by at least one processor of an electronic device, an amount of light impinging on each of a first lens of a first image capturing device and a second lens of a second image capturing device, the first and second image capturing device disposed on a same surface of the electronic device. The method includes, in response to detecting a blockage of light entering a lens of one of the at least two image capturing devices, the blockage occurring for a duration exceeding a preset time, setting, as an active image capturing device among the at least two image capturing devices, a selected one of the at least two image capturing devices having a corresponding lens at which the blockage is detected.

According to a third described aspect of the disclosure, there is provided a computer program product comprising a non-transitory computer readable medium having program instructions that when executed by a processor of an electronic device configures the electronic device to perform the various functions of the above-described method.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices and/or performed by the communication/electronic device are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the communication device and/or computing device to complete the functionality of a respective one of the above-described processes when the program instructions or code are processed by at least one processor of the corresponding electronic/electronic device, such as is described herein.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the numbered terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 110 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of an electronic device 110, within which various aspects of the disclosure can be implemented, according to one or more embodiments. Electronic device 110 includes specific components and/or modules that enable the device to select an image capturing device based on detecting a blocking of light entering a lens of the image capturing device. Examples of electronic device 110 include, but are not limited to, mobile devices, a notebook computer, a mobile phone, a smart phone, a digital camera with enhanced processing capabilities, a smart watch, a tablet computer, and other types of communication device that includes or can be directly connected a display capable of presenting notifications and/or associated content. It is appreciated that electronic device 110 can be other types of communication devices that allow selective capturing of images via one of a plurality of image capturing devices disposed on the same surface of the device. In the illustrative embodiments, electronic device 110 is specifically presented as a mobile phone or communication device.

Communication device 110 includes processor 102 (typically as a part of a processor integrated circuit (IC) chip), which includes processor resources such as central processing unit (CPU) 103a, communication signal processing resources such as digital signal processor (DSP) 103b, and graphics processing unit (GPU) 103c. Processor 102 can, in some embodiments, include high quality camera image signal processors (ISPs) (not shown) and dedicated artificial intelligence (AI) engines 105. Collectively, processor 102 supports computing, classifying, processing, transmitting and receiving of data and information, and presenting of graphical images within a display. Processor 102 is communicatively coupled to storage device 104, system memory 120, input devices (introduced below), output devices, including integrated displays 130A and 130B, and image capture device (ICD) controller 134. According to one or more embodiments, ICD controller 134 performs or supports functions such as, but not limited to, selecting and activating an active camera from among multiple cameras and adjusting the camera settings and characteristics (e.g., shutter speed, f/stop, ISO exposure, zoom control, field of view (FOV) angle, etc.) of the active camera.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103c and certain aspects of device communication via wireless networks are performed by DSP 103b, with support from CPU 103a. However, for simplicity in describing the features of the disclosure, the functionality provided by one or more of CPU 103a, DSP 103b, GPU 103c, and ICD controller 134 are collectively described as being performed by processor 102 operating as a controller of the communication device 110.

Throughout the disclosure, the term image capturing device (ICD) is utilized interchangeably to be synonymous with and/or refer to any one of front or rear facing cameras 132, 133. Front facing cameras 132 and rear facing cameras 133 are communicatively coupled to ICD controller 134, which is communicatively coupled to processor 102. Both sets of cameras 132, 133 include image sensors and/or lens that can capture images that are within the field of view (FOV) of the respective ICD 132, 133. Communication device 110 can include multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lens to allow for wide angle and telephoto image capture. In one or more embodiments, one or more of the ICDs may be used for performing user identification via facial recognition. The term image capturing device is utilized interchangeably herein with camera.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, general purpose applications 152, 153, and 154, light detection module 155, and communication module 156. Each module and/or application provides program instructions/code that are processed by processor 102 to cause processor 102 and/or other components of communication device 110 to perform specific operations, as described herein. Descriptive names assigned to these modules add no functionality and are provided solely to identify the underlying features performed by processing of the different modules. For example, light detection module 155 can include program code to communicate with ICD controller 134 to cause ICD controller 134 to set an image capturing device as an active image capturing device based on light blockage.

Communication module 156 within system memory 120 enables communication device 110 to communicate with wireless communication network 137 and with other devices, such as remote communication device 177 and/or other Internet-connected devices, via one or more of audio, text, and video communications. Communication module 156 can support various communication sessions by communication device 110, such as audio communication sessions, video communication sessions, text communication sessions, receiving notifications, exchange of data, and/or a combined audio/text/video/data communication session.

In one or more embodiments, communication device 110 includes removable storage device (RSD) 136, which is inserted into RSD interface 138 that is communicatively coupled via system interlink to processor 102. In one or more embodiments, RSD 136 is a non-transitory computer program product or computer readable storage device. RSD 136 may have a version of one or more of the applications (e.g., 152, 153, 154, 155, 156) stored thereon. Processor 102 can access RSD 136 to provision communication device 110 with program code that, when executed/processed by processor 102, the program code causes or configures processor 102 and/or generally communication device 110 to provide the various image capturing device selection functions described herein. The RSD 136 can be an example of a non-transitory or tangible computer readable storage device.

Communication device 110 includes integrated front and rear displays 130A-130B which both incorporate tactile, touch screen interface 131A-131B that can receive user tactile/touch input. As a touch screen device, integrated displays 130A-130B allow a user to provide input to or to control communication device 110 by touching features within the user interface presented on integrated displays 130A-130B. Tactile, touch screen interfaces 131A-131B can be utilized as input devices. The touch screen interfaces 131A-131B can each include one or more virtual buttons, indicated generally as 114a and 114b. In one or more embodiments, when a user applies a finger on one of touch screen interfaces 131A-131B in the region demarked by the virtual button 114a and/or 114b, the touch of the region causes the processor 102 to execute code to implement a function associated with the virtual button. Embodiments can include a display screen on the same surface of the electronic device as the first image capturing device and the second image capturing device, and where the controller is configured to render image content from at least one of the first image capturing device or the second image capturing device. In some implementations, integrated display 130A is a primary display that is integrated into a front surface of communication device 110, while the higher quality ICDs are located on a rear surface with rear display 130B. The specific physical and functional characteristics of integrated displays 130A-130B, e.g., screen size, aspect ratio, supported resolution, image quality, video display rate, etc., can vary and are known to or accessible by the processor 102.

Communication device 110 also includes a physical interface 165a. Physical interface 165a of communication device 110 can serve as a data port and can be coupled to charging circuitry 135 and device battery 143 to enable recharging of device battery 143.

Communication device 110 can further include microphone 108, one or more output devices such as speakers 144, and one or more input buttons 107a-107n. In one or more embodiments, speaker(s) 144 can be used to generate an audio alert when selecting an image capturing device using light blockage. Microphone 108 can also be referred to as an audio input device. In some embodiments, microphone 108 may be used for identifying a user via voiceprint, voice recognition, and/or other suitable techniques. Input buttons 107a-107n may provide controls for volume, power, and ICDs 132, 133. Additionally, communication device 110 can include input sensors 109 (e.g., enabling gesture detection by a user).

Communication device 110 further includes haptic touch controls 145, vibration device 146, fingerprint/biometric sensor 147, global positioning system (GPS) device 160, and motion sensor(s) 162. Vibration device 146 can cause communication device 110 to vibrate or shake when activated. Vibration device 146 can be activated during an incoming call or message in order to provide an alert or notification to a user of communication device 110. In one or more embodiments, vibration device 146 can be used to generate a haptic alert when selecting an image capturing device using light blockage of a corresponding camera lens. According to one aspect of the disclosure, integrated displays 130A and 130B, speakers 144, and vibration device 146 can generally and collectively be referred to as output devices.

Biometric sensor 147 can be used to read/receive biometric data, such as fingerprints, to identify or authenticate a user, and in some embodiments, the biometric sensor 147 can supplement an ICD (camera) for user detection/identification.

GPS device 160 can provide time data and location data about the physical location of communication device 110 using geospatial input received from GPS satellites. Motion sensor(s) 162 can include one or more accelerometers 163 and gyroscope 164. Motion sensor(s) 162 can detect movement of communication device 110 and provide motion data to processor 102 indicating the spatial orientation and movement of communication device 110. Accelerometers 163 measure linear acceleration of movement of communication device 110 in multiple axes (X, Y and Z). Gyroscope 164 measures rotation or angular rotational velocity of communication device 110. Communication device 110 further includes a housing that contains/protects the components internal to communication device 110.

Communication device 110 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. WCS 142 and antennas 148 allow communication device 110 to communicate wirelessly with a wireless communication network 137 via transmissions of communication signals to and from network communication devices, such as base stations or cellular nodes, of wireless communication network 137.

Wireless communication network 137 further allows communication device 110 to wirelessly communicate with remote communication device 177, which can be similarly connected to wireless communication network 137. Communication device 110 can also communicate wirelessly with wireless communication network 137 via communication signals transmitted by short range communication device(s) to and from an external WiFi/BT transceiver device 166, which is communicatively connected to wireless communication network 137. In one or more embodiments, wireless communication network 137 can be interconnected with a wide area network that can include one or more devices that support exchange of audio and video messages, data, and/or other communication between communication device 110 and remote communication device 177.

Wireless interface 165b can be a short-range wireless communication component providing Bluetooth, near field communication (NFC), and/or wireless fidelity (Wi-Fi) connections. In one embodiment, communication device 110 can receive Internet or Wi-Fi based calls via wireless interface 165b. In one embodiment, communication device 110 can communicate wirelessly with external wireless transceiver device 166, such as a WiFi router or BT transceiver, via wireless interface 165b. In an embodiment, WCS 142, antenna(s) 148, and wireless interface 165b collectively provide communication interface(s) of communication device 110.

Figure 2B:
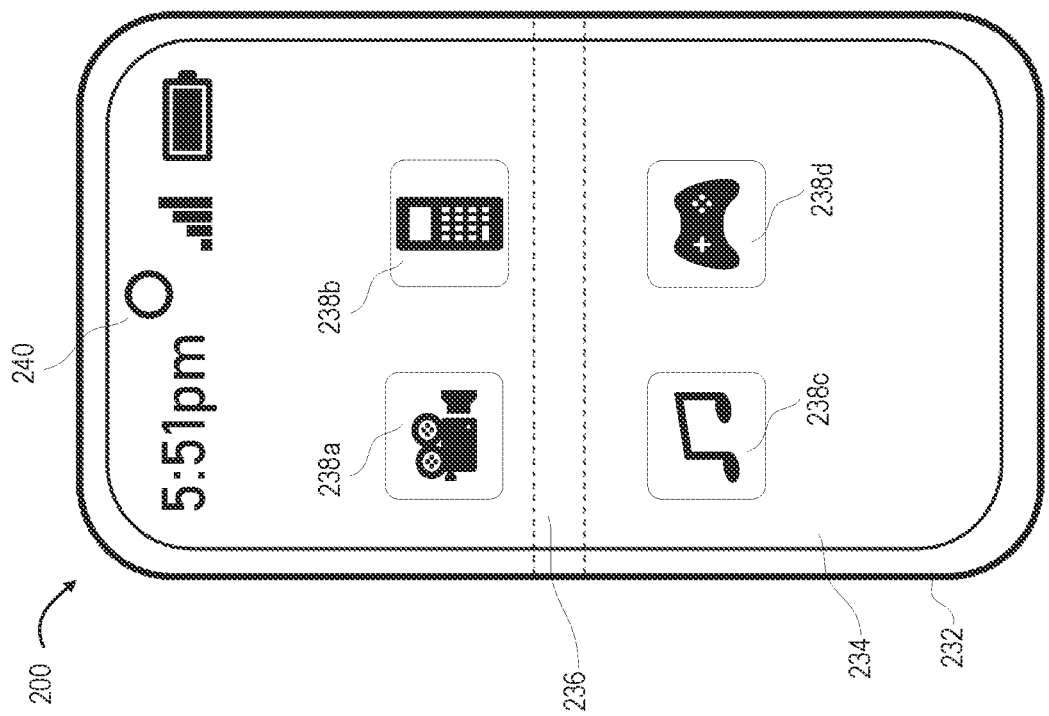
FIG. 2B is a diagram illustrating a second surface of the example foldable communication device of FIG. 2A, according to one or more embodiments.
Figure 2A:
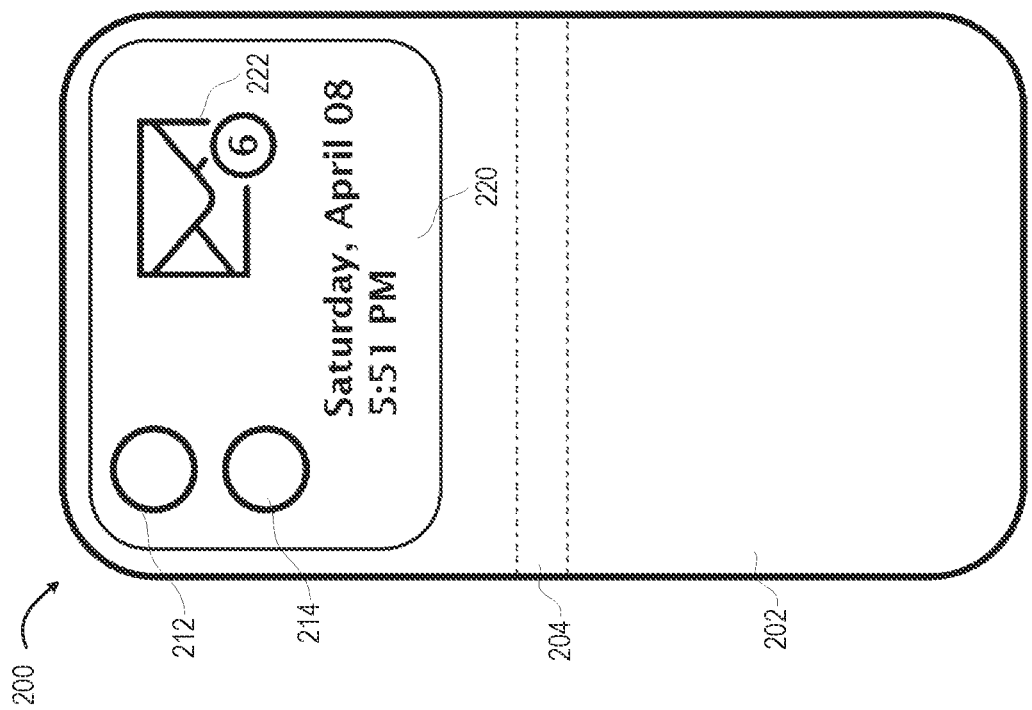
FIG. 2A is a diagram illustrating a first surface of an example foldable communication device, with multiple cameras, according to one or more embodiments.

FIG. 2A is a diagram illustrating a first surface 202 of an example communication device 200, according to one or more embodiments. Communication device 200 can be a smartphone, tablet computer, or other electronic device. In one or more embodiments, the first surface 202 may be referred to as a 'rear surface' of the communication device 200. Disposed on the first surface are first lens 212, corresponding to a first image capturing device, and second lens 214, corresponding to a second image capturing device. In one or more embodiments, the first lens 212 and second lens 214 are disposed on a same surface of the device 200. An electronic display 220 is disposed proximal to the first lens 212 and second lens 214. In one or more embodiments, the first lens 212 and second lens 214 are disposed within an area of the electronic display 220, as illustrated in FIG. 2A. In alternate embodiments, the first and second lens 212 and 214 can be dispose in an area outside of the electronic display 220. The first lens 212 can differ from the second lens 214 in terms of field of view (FOV). In one or more configurations, the electronic display 220 can be used to display information to a user such as a current time and date, and/or a notification of new messages, such as depicted at 222. Other icons and/or information may be rendered instead of, or in addition to, the information shown on electronic display 220 in FIG. 2A.

Communication device 200 is configured as a flip-phone having a bifurcated housing (i.e., two separate housing) that includes a foldable region 204. The foldable region 204 may include a specialized hinge mechanism that allows the communication device 200 to fold and unfold smoothly without putting undue stress on front electronic display (234, FIG. 2B) and/or other components.

FIG. 2B is a diagram illustrating a second surface 232 of the example communication device 200 of FIG. 2A, according to one or more embodiments according to one or more embodiments. In one or more embodiments, the second surface 232 may be referred to as a 'front surface' of the communication device 200. Disposed on the second surface are a foldable electronic display 234, and a front-facing (self-photo) camera lens 240. Foldable electronic display 234 of communication device 200 can render a variety of application icons that correspond to applications, indicated as 238a-238d. The applications can include media players, games, messaging applications, and more. The foldable electronic display 234 includes a foldable region 236. In one or more embodiments, the foldable electronic display 234 includes layers of thin, flexible, materials, such as plastic, and/or an organic light-emitting diode (OLED) display that can flex without damage. When the device 200 is folded, the display is folded using a hinge mechanism that enables the display to be folded without damage.

FIG. 3A is a diagram illustrating a side view of the example communication device 200 of FIG. 2A, in an extended/open configuration, according to one or more embodiments. As can be seen in FIG. 3A, the communication device 200 is in an extended (unfolded) position. Communication device 200 includes a first housing 252 and a second housing 254, and a hinge mechanism 268 disposed between the first (upper) housing 252 and the second (lower) housing 254, enabling the electronic device 200 to be changed between an open position and a folded position. The first lens 212 and the second lens 214 are both located within the first housing 252.

FIG. 3B is a diagram illustrating a side view of the example communication device 200 of FIG. 2A, in a folded configuration, according to one or more embodiments. As shown in FIG. 3B, communication device 200 is folded such that second housing 254 is in contact with the first housing 252 along dimension Y. In this configuration when the electronic device is held by a user in the folded position, the first lens and the second lens are reachable by a finger of the user.

FIG. 4A is a diagram illustrating an example of selecting a first image capturing device based on detected blockage of light entering a lens of the first image capturing device, according to one or more embodiments. As shown in FIG. 4A, device 200 is in a folded configuration similar to as shown in FIG. 3B. A finger 262 of a user is placed over lens 212, impinging light directed towards the lens 212, thereby reducing the level (i.e., amount) of light entering the lens 212, while lens 214 is itself not blocked (i.e., not fully covered over by or in direct contact with a physical obstruction). Accordingly, the amount of light entering lens 214 is greater than the amount of light entering lens 212.

FIG. 4B is a diagram illustrating rendering of image content from the first image capturing device that was selected based on detected blockage of light entering a lens of the first image capturing device, according to one or more embodiments. Device 200 is rendering image content 264 on display 220. The image content 264 is associated with an active image capturing device. The active image capturing device corresponds to lens 212, which was blocked or partially blocked from receiving light by an object, such as a human finger, held in front of the lens for a duration exceeding a predetermined time interval. By rendering the image content 264 on the display 220, the user can take a self-photograph using the selected image capturing device disposed on the same surface as display 220. In one or more embodiments, taking the photograph can be accomplished by tapping an area of display 220, uttering a voice command, making a gesture, or other suitable technique.

Figure 5A:
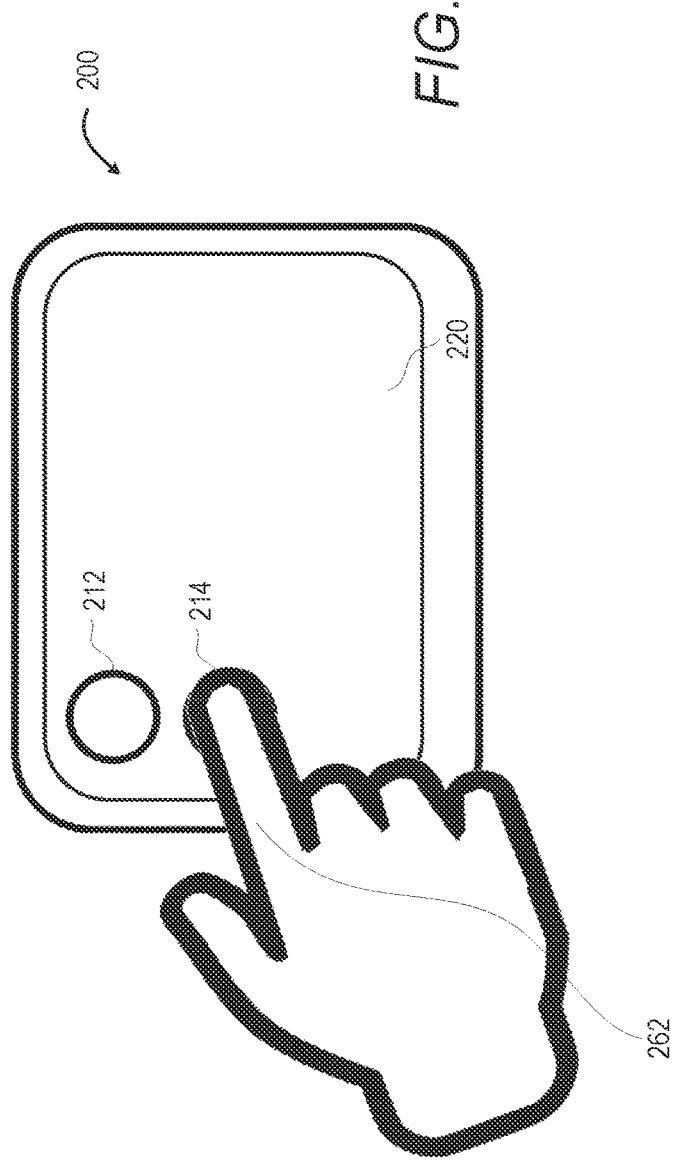
FIG. 5A is a diagram illustrating an example of selecting a second image capturing device using light blockage of the camera lens, according to one or more embodiments.

FIG. 5A is a diagram illustrating an example of selecting a second image capturing device based on detected blockage of light entering a lens of the second image capturing device, according to one or more embodiments. As shown in FIG. 5A, device 200 is in a folded configuration, similar to as shown in FIG. 3B. A finger 262 of a user is placed over lens 214, blocking or partially blocking light directed towards the lens 214, thereby reducing the level (or amount) of light entering the second lens 214. Thus, the amount of light entering first lens 212 is greater than the amount of light entering second lens 214, and the amount of light entering second lens 214 is measurably less than the amount of light entering second lens 214 before second lens 214 was blocked.

Figure 5B:
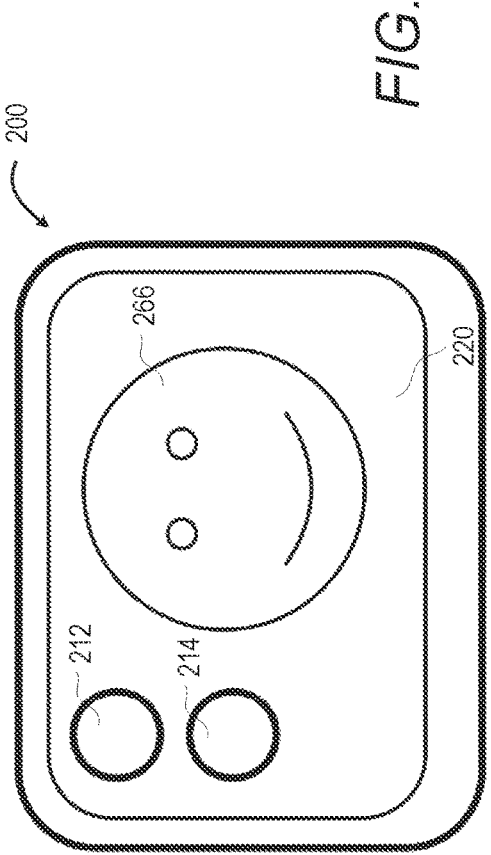
FIG. 5B is a diagram illustrating rendering of image content from the second image capturing device that was selected using light blockage of the camera lens, according to one or more embodiments.

FIG. 5B is a diagram illustrating rendering of image content from the second image capturing device that was selected based on detected blockage of light entering a lens of the second image capturing device, according to one or more embodiments. Device 200 is rendering image content 266 on display 220. The image content 266 is associated with an active image capturing device. The active image capturing device corresponds to lens 214, which was activated by being blocked for a duration exceeding a predetermined time interval. By rendering the image content 266 on the display 220, the user can take a self-photograph using the selected image capturing device. In one or more embodiments, taking the photograph can be accomplished by tapping an area of display 220, uttering a voice command, making a gesture, or other suitable technique.

The field of view (FOV) associated with lens 212 can be different than the FOV associated with lens 214. As an example, lens 212 can be a wide-angle lens associated with a FOV ranging from 70 to 90 degrees, whereas lens 214 can be a portrait lens with a FOV ranging from 35 degrees to 50 degrees. Other FOVs are possible in disclosed embodiments. Furthermore, while two lenses are shown in FIGS. 2A-5B, other embodiments may have more than two image capturing devices and more than two lenses disposed on a same surface of an electronic device. In one or more embodiments, the at least two image capturing devices comprises a wide-angle image capturing device and a telephoto image capturing device. In one or more embodiments, the controller is configured to change the active image capturing device from the first image capturing device to the second image capturing device in response to detecting blockage of light entering a lens of the second image capturing device, and vice-versa. In one or more embodiments, the controller is configured to change the active image capturing device from the first image capturing device to the second image capturing device in response to detecting the blockage on/at the second image capturing device, the blockage occurring for a next duration exceeding the preset time.

Figure 6:
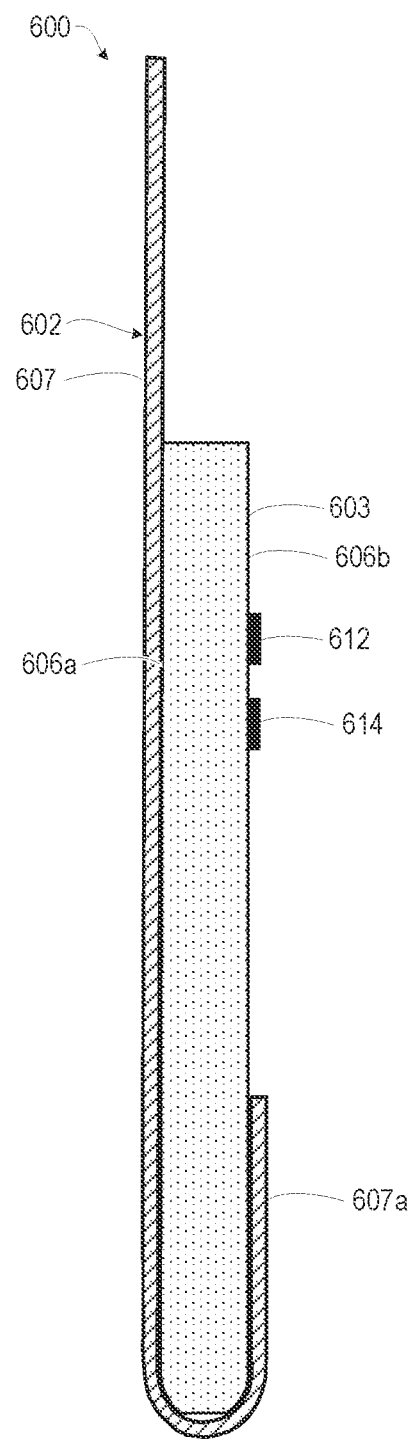
FIG. 6 is a diagram illustrating a side view of a communication device with a flexible scrollable display and multiple image capturing devices on a rear surface, according to one or more embodiments.

FIG. 6 is a diagram illustrating a side view of a communication device with a flexible scrollable display and multiple image capturing devices on a rear surface, according to one or more embodiments. According to aspects of the present disclosure, communication device 600 includes blade assembly 602 slidably coupled to device housing 603 and carrying flexible display 607. Communication device 600 includes a translation mechanism operable to slide blade assembly 602 relative to device housing 603 between an extended position and a retracted position. In the retracted position, more of blade assembly 602 is rolled onto back side 606b of housing 603. In the extended position, more of blade of assembly 602 is rolled onto front side 606a to extend beyond an opposite edge of housing 603. In one or more embodiments, the communication device 600 may be referred to as a 'scrollable display device.'

A portion of the flexible display, indicated as 607a, is disposed on the same surface as lens 612, corresponding to a first image capturing device, and lens 614, corresponding to a second image capturing device. Accordingly, in one or more embodiments, a communication device with a scrollable display such as shown in FIG. 6 also supports selection of an image capturing device by detecting a blockage of light entering a lens of an image capturing device of the communication device.

Figure 7:
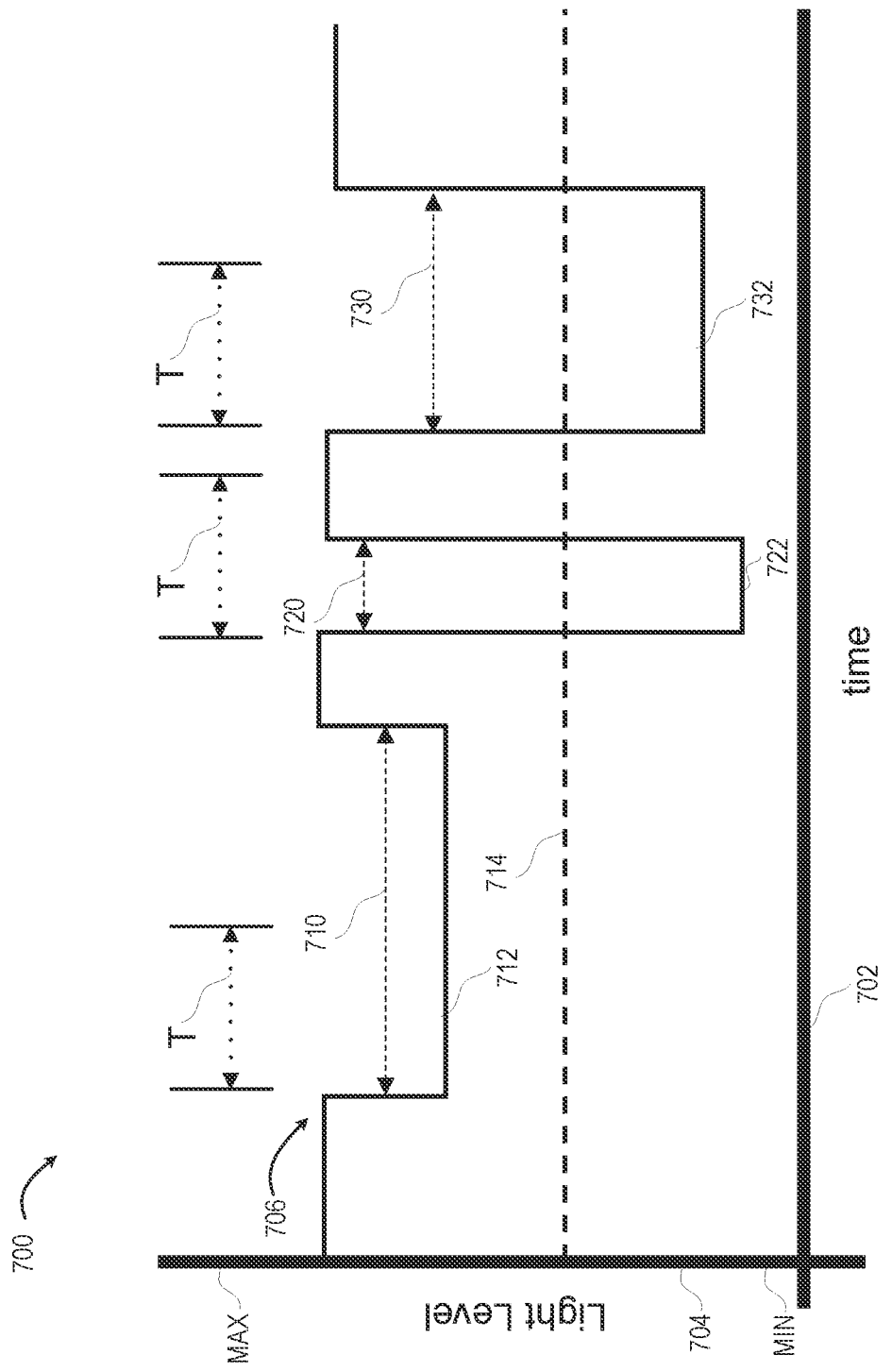
FIG. 7 depicts a graph illustrating changes in detected/received light level, which is used for selection of an image capturing device, according to one or more embodiments.

FIG. 7 depicts a graph 700 illustrating a change in light level used for selection of an image capturing device, according to one or more embodiments. Graph 700 includes a horizontal axis 702 representing time, and a vertical axis 704 representing light level. The light level scale has a maximum level, indicated as MAX, along vertical axis 704, and a minimum light level, indicated as MIN, also along vertical axis 704. A threshold light level 714 determines a light level below which a lens blockage can be registered. A predetermined time interval T represents a time interval that is exceeded in order to register a lens blockage.

Light response curve 706 shows a change in light level over time. A first dip in light level is shown at 712 having a duration indicated at 710. Although duration 710 exceeds the predetermined time interval T, the first dip 712 does not register as a blockage because the light level at the first dip does not fall below the threshold light level 714. A second dip in light level is shown at 722, having a duration indicated at 720. Although the light level at the second dip falls below the threshold light level 714, the second dip 722 does not register as a blockage because the duration of the blockage does not exceed the predetermined time interval T. A third dip in light level is shown at 732, having a duration indicated at 730. Since the light level at the third dip falls below the threshold light level 714, and the duration of the blockage exceeds the predetermined time interval T, the third dip registers as a blockage that causes an electronic device of the disclosed embodiments to select the image capturing device that detected dip 732 to become the active image capturing device. In one or more embodiments, the time interval T can be a value in the range from one second to three seconds. Other values are possible in disclosed embodiments.

According to one or more embodiments, activation of the features of the disclosure occurs when the user switches the communication device to an image capturing mode, and specifically a self-photo-mode. A first image capturing device can be the default camera that is initially made the active image capturing device. Another image capturing device is then held in an off or dormant or inactive state until selected by the user placing their finger in front of the lens of the other image capturing device. In one or more embodiment, the selected active image capturing device can be indicated within the display so the user is aware of which image capturing device is currently presented its image content on the display.

In one or more embodiments, the threshold light level 714 and/or the predetermined time interval T may be user-selectable values. This feature can enable a user to customize the image capturing device selection response to light level fluctuations to suit an individual's preferences. As an example, a first user may select a shorter value for T (e.g., one second) for a fast response. Similarly, a second user may select a longer value for T (e.g., three seconds) to reduce the chance of an unintentional selection of an image capturing device to become active. Accordingly, one or more embodiments can support customizable predetermined time intervals for camera selection based on light blockage.

Figure 8:
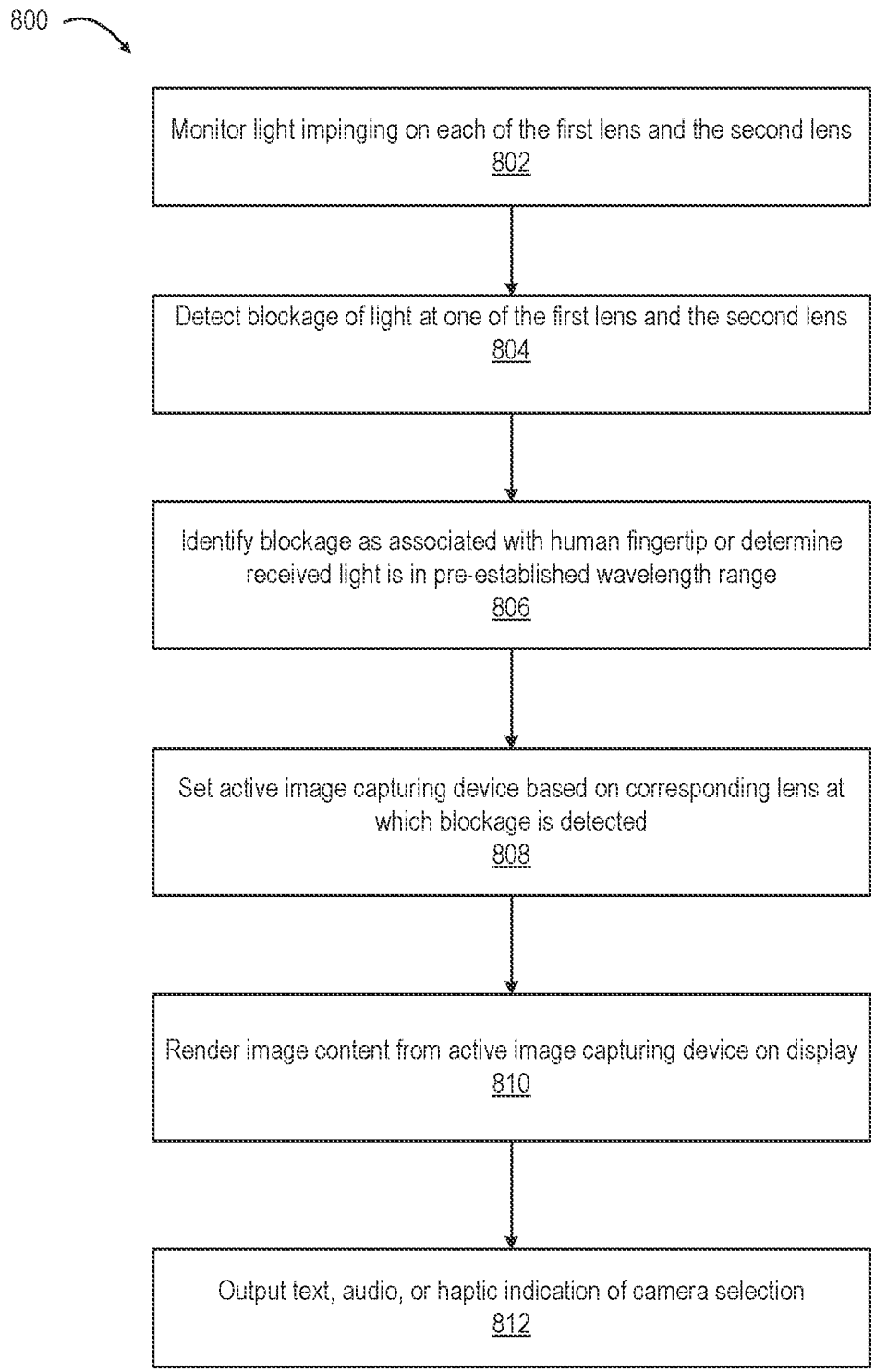
FIG. 8 depicts a flowchart of a method by which a communication device enables selection of a camera based on light blockage of a lens of the camera, according to one or more embodiments.

Referring now to FIG. 8, there is illustrated a flow diagram presenting an embodiment of a method 800 performed by an electronic device to enable selecting a camera based on detecting a blockage of light entering a lens of an image capturing device of the electronic device, according to one or more embodiments. The descriptions of method 800 depicted in FIG. 8 is provided with general reference to the specific components and/or features illustrated within the preceding FIGS. 1-7.

FIG. 8 depicts a flowchart of a method 800 by which a camera is selected based on detecting a blockage of light entering a lens of an image capturing device of the electronic device, according to one or more embodiments. The method begins at block 802 at which the method includes monitoring light impinging on each of a first lens and a second lens disposed on a same surface of an electronic device. The monitoring can include monitoring for a light level. In one or more embodiments, the light level can be computed as a percentage of a maximum level. In some embodiments, the light level can be computed as a value in lumens. The monitoring can include monitoring for a drop in a light level that lasts for a predetermined threshold period of time. At block 804, the method 800 includes detecting blockage of light at one of the first lens and the second lens. The detecting can include detecting a decrease in the amount of light entering one of the lenses. The detecting can include comparing a difference in the amount of light entering the first lens as compared with the second lens, or vice versa.

At block 806, method 800 includes identifying whether the blockage of light is associated with a human finger in proximity to the lens or provides light in a particular wavelength. Thus, the monitoring can include monitoring for detecting a human fingertip. The detecting can be based on pattern recognition, including, but not limited to, machine-learning based image classifiers. In one or more embodiments, as a human fingertip approaches the lens, the fingertip occupies a large percentage of the FOV of the image. In some embodiments, in response to a human fingertip causing a drop in detected light level for a duration exceeding a predetermined time interval, the processor registers the event as a trigger event for selection of a corresponding camera to be used as an active image capturing device. In one or more embodiments, the predetermined time interval can range from one second to three seconds. In some embodiments, the predetermined time interval is selectable by a user. In one or more embodiments, the predetermined percentage of the FOV has a value in the range from 75 percent to 100 percent. Even for a 100% blockage of the light, with one or more embodiments, the camera selection features of the disclosure do not require a user to make physical contact with a lens to select an active image capturing device.

Optionally, in one or more embodiments, the monitoring can include detecting light in a wavelength range. For example, in one or more embodiments, the wavelength range can include a wavelength ranging from 580 nanometers to 630 nanometers. In one or more embodiments, the wavelength range can include a wavelength ranging from 590 nanometers to 610 nanometers. These wavelengths may be indicative of a human finger being very close to a lens, which, due to the opacity of the finger, can be detected as an orange color (or hue) in an image capturing device. In one or more embodiments, to detect the blockage, the controller detects, within an image captured by the corresponding lens, an object that reflects light from a wavelength ranging from 580 nanometers to 630 nanometers.

Returning to FIG. 8, the method 800 further includes, at block 808, setting, as an active image capturing device, a select one of the first and second image capturing device, selected based on detection of a light blockage at a corresponding lens of the image capturing device. As an example, an electronic device such as a smartphone can have two, three, or more lenses on a surface (such as the rear-facing surface) of the device. When a user blocks light entering one of the multiple lenses such that the selection criteria of light level and duration are satisfied, then the image capturing device associated with the lens that was blocked is set as the active image capturing device. The method 800 further includes, at block 810, rendering image content from the active image capturing device on an electronic display. The electronic display can include an electronic display on the same surface as the multiple lenses. Accordingly, when users take self-photos, they can see the image content corresponding to the selected image capture device, making it easier for users to ensure that the desired imagery is captured in the photographs they take.

In many prior art electronic devices, rear-facing cameras, while being of higher quality than a front-facing camera, were not convenient for taking self-photographs. However, with the advent of foldable and scrollable smartphones, it is now feasible to use the rear-facing cameras for the very popular application of taking self-photographs.

The method 800 can optionally continue with outputting an indication at block 812 of the activation of the specific one of the image capturing devices. The indication can be outputted as one or more of a text, an audio, and/or a haptic indication. The text indication can be displayed on the display device. The output audio indication can include a tone, such as a beep, or other suitable tone or sound sequence. The output audio indication can include a sound sample, such as a wav file or other suitable audio file. The output audio indication can include a speech utterance, which can include synthesized speech or an audio file of a human voice, indicating that an image capturing device has been selected. In one or more embodiments, the speech utterance may include the specific image capturing device that is selected. As an example, in response to a light blockage of an ultra-wide camera, a speech utterance such as 'ultra-wide camera selected' can be output from an audio output device such as a built-in speaker (144 of FIG. 1), or via a connected audio output device such as a Bluetooth speaker, headphones, or earbuds. Thus, in one or more embodiments, the electronic device includes an audio output device, and the controller of the electronic device outputs an audio indication in response to setting the active image capturing device.

The haptic indication can include a vibration that is generated from a vibration device (e.g., 146 of FIG. 1). This can be useful in noisy environments where it may be difficult for a user to hear an audio indication. In one or more embodiments, the haptic indication may be based on the specific image capturing device that is selected. As an example, in response to a light blockage of an ultra-wide camera, two short bursts of vibration can be issued, and in response to a light blockage of a portrait camera, three short bursts of vibration can be issued. Accordingly, disclosed embodiments can provide a haptic indication that enables a user to confirm that he/she has successfully selected an image capturing device by using blockage of light at a corresponding lens. Thus, in one or more embodiments, the electronic device includes a haptic output device, and the controller of the electronic device outputs a haptic indication in response to setting the active image capturing device. Disclosed embodiments are not limited to wide-angle or telephoto cameras. In one or more embodiments, combinations of image capturing devices (cameras) can include, but are not limited to, infrared cameras, monochrome cameras, time-of-flight (TOF) cameras, depth sensor cameras, light field cameras, and/or other suitable camera types.

As can now be appreciated, the disclosed embodiments improve the user experience regarding selection of a camera from amongst multiple cameras in an electronic device such as a smartphone. The disclosed embodiments utilize detection of blockage of light entering a lens of an image capturing device as a mechanism for camera selection. A user can block the lens with his/her finger to select the image capturing device corresponding to the blocked lens. In one or more embodiments, the lens may be partially blocked in order to select the corresponding image capturing device. Thus, in embodiments, the image capturing device can be selected without the need for physical contact with the lens. In one or more embodiments, to detect the blockage, the controller receives a signal identifying that a light captured by the corresponding lens is a first color light that is indicative of placement of a human fingertip substantially close to the corresponding lens. In one or more embodiments, the fingertip can be placed within 15 millimeters from the surface of the lens in order to register a blockage. Another advantage of the disclosed embodiments is that the camera selection can be performed while the user is wearing gloves, as contact with a touchscreen is not required to select an active image capturing device. Thus, the disclosed embodiments improve the technical field of camera selection in an electronic device such as a smartphone.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
   an enclosure comprising a first surface and a second surface;
   at least two image capturing devices including: (i) a first image capturing device having a first lens and that produces first image content; and (ii) a second image capturing device having a second lens that differs from the first lens and that produces second image content, and wherein the first image capturing device and the second image capturing device are disposed on a same surface of the electronic device; and
   a controller communicatively coupled to the first image capturing device and the second image capturing device, and which:

monitors an amount of light impinging on each of the first lens and the second lens; and in response to detecting a blockage of light entering a lens of one of the at least two image capturing devices, the blockage occurring for a duration exceeding a preset time, setting, as an active image capturing device among the at least two image capturing devices, a selected one of the at least two image capturing devices having a corresponding lens at which the blockage is detected.

2. The electronic device of claim 1, further comprising a display screen on the same surface of the electronic device as the first image capturing device and the second image capturing device, and wherein the controller is configured to render image content from at least one of the first image capturing device or the second image capturing device.

3. The electronic device of claim 1, wherein the at least two image capturing devices comprises a wide-angle image capturing device and a telephoto image capturing device.

4. The electronic device of claim 1, wherein the enclosure comprises a first housing and a second housing, and wherein the electronic device further comprises:

a hinge mechanism disposed between the first housing and the second housing, enabling the electronic device to be changed between an open position and a folded position, and wherein the first lens and the second lens are both located within the first housing, such that when the electronic device is held by a user in the folded position, the first lens and the second lens are reachable by a finger of the user.

5. The electronic device of claim 1, wherein the controller is configured to change the active image capturing device from the first image capturing device to the second image capturing device in response to detecting the blockage on the second image capturing device, the blockage occurring for a next duration exceeding the preset time.

6. The electronic device of claim 1, further comprising an audio output device, and wherein the controller outputs an audio indication in response to setting the active image capturing device.

7. The electronic device of claim 1, further comprising a haptic output device, and wherein the controller outputs a haptic indication in response to setting the active image capturing device.

8. The electronic device of claim 1, wherein to detect the blockage, the controller receives a signal identifying that a light captured by the corresponding lens is a first color light that is indicative of placement of a human fingertip substantially close to the corresponding lens.

9. The electronic device of claim 1, wherein to detect the blockage, the controller detects, within an image captured by the corresponding lens, an object that reflects light from a wavelength ranging from 580 nanometers to 630 nanometers.

10. A method comprising:

monitoring, by at least one processor of an electronic device, an amount of light impinging on each of a first lens of a first image capturing device and a second lens of a second image capturing device, the first image capturing device and the second image capturing device disposed on a same surface of the electronic device; and in response to detecting a blockage of light entering a lens of one of the first or second image capturing devices, the blockage occurring for a duration exceeding a preset time, setting, as an active image capturing device among the first or second image capturing devices, a selected one of the first or second image capturing devices having a corresponding lens at which the blockage is detected.

11. The method of claim 10, wherein the electronic device further comprises a display screen on the same surface of the electronic device as the first image capturing device and the second image capturing device, and the method further comprises rendering image content from at least one of the first image capturing device and second image capturing device on the display screen.

12. The method of claim 11, further comprising changing the active image capturing device from the first image capturing device to the second image capturing device in response to detecting the blockage on the second image capturing device, the blockage occurring for a next duration exceeding the preset time.

13. The method of claim 10, wherein the electronic device further comprises an audio output device, and the method further comprises outputting an audio indication on the audio output device in response to setting the active image capturing device.

14. The method of claim 10, wherein the electronic device further comprises a haptic output device, and the method further comprises outputting a haptic indication on the haptic output device in response to setting the active image capturing device.

15. The method of claim 10, wherein detecting a blockage further comprises receiving a signal identifying that a light captured by the corresponding lens is a first color light that is indicative of placement of a human fingertip substantially close to the corresponding lens.

16. The method of claim 10, wherein detecting a blockage further comprises detecting an object that reflects light from a wavelength ranging from 580 nanometers to 630 nanometers.

17. A computer program product comprising a non-transitory computer readable medium having program instructions that when executed by a processor of an electronic device, configures the electronic device to perform functions comprising:

monitoring an amount of light impinging on each of a first lens of a first image capturing device and a second lens of a second image capturing device, the first image capturing device and the second image capturing device disposed on a same surface of the electronic device; and in response to detecting a blockage of light entering a lens of one of the first or second image capturing devices, the blockage occurring for a duration exceeding a preset time, setting, as an active image capturing device among the first or second image capturing devices, a selected one of the first or second image capturing devices having a corresponding lens at which the blockage is detected.

18. The computer program product of claim 17, wherein the electronic device further comprises a display screen on the same surface of the electronic device as the first image capturing device and the second image capturing device, and wherein the program instructions further comprise program instructions for rendering image content from at least one of the first image capturing device and second image capturing device on the display screen.

19. The computer program product of claim 17, wherein the program instructions further comprise program instructions for configuring the electronic device to change the active image capturing device from the first image capturing device to the second image capturing device in response to detecting the blockage on the second image capturing device, the blockage occurring for a next duration exceeding the preset time.

20. The computer program product of claim 17, wherein the electronic device further comprises a haptic output device, and wherein the computer program product further comprises program instructions for outputting a haptic indication on the haptic output device in response to setting the active image capturing device.

* * * * *